United States Patent

[11] 3,601,563

| [72] | Inventors | Jean-Pierre Serpette;<br>Francois Peroy, both of Billancourt, France |
|---|---|---|
| [21] | Appl. No. | 872,897 |
| [22] | Filed | Oct. 31, 1969 |
| [45] | Patented | Aug. 24, 1971 |
| [73] | Assignees | Regie National Des Usines Renault<br>Billancourt, ;<br>Automobiles Peugeot<br>Paris, France |
| [32] | Priority | Nov. 7, 1968 |
| [33] | | France |
| [31] | | 172911 |

[54] SHOCK-SENSITIVE SAFETY CUTOUT DEVICE FOR AUTOMOTIVE VEHICLES
6 Claims, 4 Drawing Figs.

[52] U.S. Cl. .................................................. 200/61.5
[51] Int. Cl. .................................................. H01h 35/14
[50] Field of Search .................................. 200/61.45–61.53, 61.5; 340/262

[56] References Cited
UNITED STATES PATENTS

| 2,586,384 | 2/1952 | Rudisill .................... | 200/61.48 |
| 3,493,704 | 2/1970 | Espasa Fanes ............ | 340/262 X |
| 3,518,385 | 6/1970 | Boudes et al. ............. | 200/61.45 |

FOREIGN PATENTS

| 748,860 | 4/1933 | France .................. | 200/61.45 |
| 355,475 | 1/1938 | Italy ..................... | 200/61.52 |
| 1,516,858 | 11/1968 | France .................. | 200/61.45 |

OTHER REFERENCES

Auslegeschrift (German Application) 1248777, Aug. 31, 1967, Pecher et al. 200-61.45 (copy in Scientific Library) 1 sheet drawing, 3 pages spec.

*Primary Examiner*—Robert K. Schaefer
*Assistant Examiner*—M. Ginsburg
*Attorney*—Stevens, Davis, Miller & Mosher

ABSTRACT: This safety cutout consists of two members enclosed in a case, the first member being an electric switch and the other a deceleration detector comprising a pivoted assembly of particularly low frictional characteristic, of which the equilibrium is disrupted by overstepping a dead center from a threshold of horizontal deceleration applied to an inertia weight associated with the electric switch and causing the automatic opening thereof.

SHOCK-SENSITIVE SAFETY CUTOUT DEVICE FOR AUTOMOTIVE VEHICLES

The present invention relates to a shock-sensitive safety cutout device notably for automotive vehicles.

The function of safety cutouts in an automotive vehicle is well known. In case of shock or crash, whether from the front, the rear or laterally, it must cut out the electric supply of the vehicle to prevent an outbreak of fire. These devices must have a high cutting capacity since they are inserted in the main circuit of the vehicle.

Most known devices of this type utilize a mercury switch, or an inertia weight retained by a friction lock, or a ball centered in a cup. The first type of safety cutouts is expensive, the second one may tend to be unreliable due to the friction factor, and the third one is likely to be disturbed by jolts caused by road unevennesses.

It is the object of this invention to provide a safety cutout device adapted to avoid the inconveniences mentioned hereinabove, and to cut out considerable current values. This device is characterized in that it consists of two member, the first member being an electric switch and the other a deceleration detector in the form of a pivoted unit of the low-friction type, of which the state of equilibrium is disrupted when overstepping a dead center position after a minimum horizontal deceleration has been applied; to an inertia weight associated with the switch, thus causing the automatic opening thereof.

Moreover, in the device of this invention the current is not caused to flow through the ground since it is possible to advantageously cut out or open only a single circuit for example the one connected to the positive terminal of the storage battery in the most frequent case where the negative terminal is grounded. Other features of this invention will appear as the following description proceeds with reference to the attached drawings. In these drawings.

Figure 1:
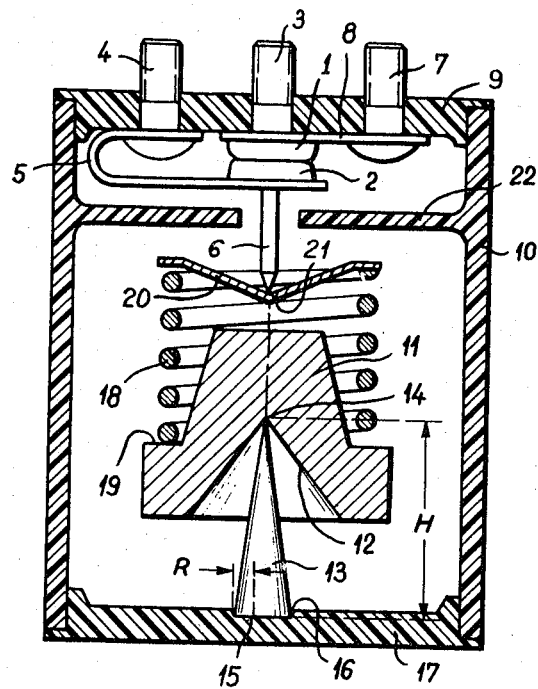
FIG. 1 is a cross-sectional view of a device according to this invention, in its normal or closed position.

Referring to the drawings and notably to FIG. 1, it will be seen that the electric switch of the device comprises a pair of contact studs 1 and 2 connected to corresponding current input and output terminals 3 and 4 respectively. Contact stud 1 acting as a fixed contact is rigid with terminal 3, and contact stud 2 acting as a movable contact is connected to the other terminal 4 via a resilient conducting blade 5 constantly urging the movable contact stud 2 away from the fixed contact stud 1. A depending pin 6 rigid with the movable contact stud 2 connects the latter to the deceleration detector. An additional terminal 7 of which the function will be described presently is connected by a contact strip 8 to terminal 3. A cover 9 closing the top of the case 10 of the device acts as terminal-supporting member.

The detector comprises an inertia weight 11 formed in its lower face with the conical cavity 12 engaged by a conical member 13 having an apex angle considerably smaller than that of said cavity 12. The inertia weight 11 is centered and pivoted to the apex 14 of the conical member 13 and the latter has its base 15 normally seated in a shallow circular recess 16 formed in the inner face of the bottom cover 17 closing the other end of case 10.

Between the pin 6 and inertia weight 11 a coil compression spring 18 is normally prestressed and engages with one end a peripheral shoulder 19 formed on said inertia weight 11 and on the other hand the peripheral flange of a wide-angle dished or tapered member 20 centered by and pivoted to the pointed end 21 of the depending pin 6.

The cylindrical case 10 and the end covers 9 and 17 thereof enclosing these elements consist of insulating material; the case 10 comprises an inner transverse partition 22 for preventing the detector elements from short circuiting the switch.

This device operates as follows:

In the normal position shown in FIG. 1 the pin 6 and cone 13 are coaxial and the force of spring 18 is exerted in the direction of the line 14 to 21 also containing the cone axis, so that the superposed elements comprising the cone 13, inertia weight 11, spring 18, dished member 20 and pin 6 are in a condition of stable equilibrium. More particularly, if F is the direction of the force exerted by the spring 18 and R the radius of the base 15 of cone 13, a torque F ×R is necessary for tilting this cone.

Figure 2:
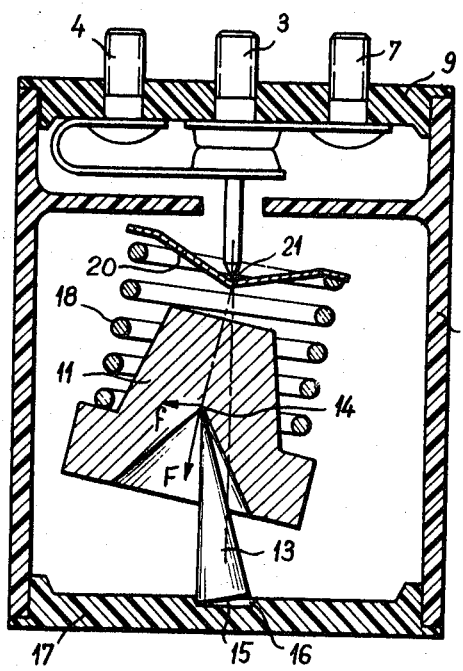
FIG. 2 is a similar view showing the device subjected to a force $f$ tending to break the equilibrium of the deceleration detector means.
Figure 3:
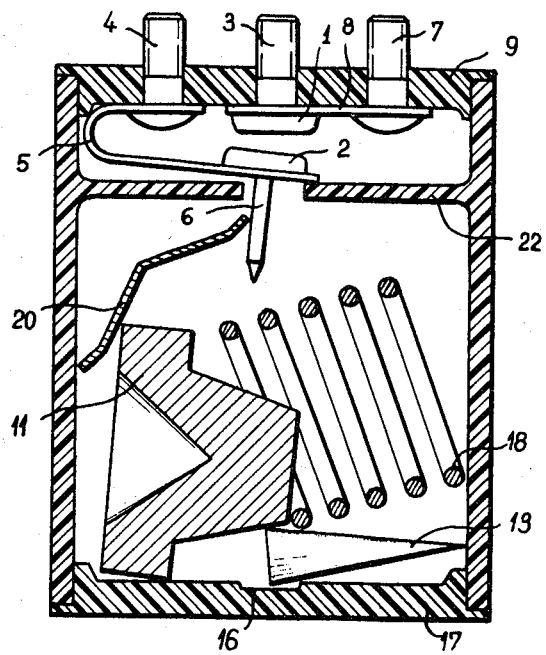
FIG. 3 is a similar view showing the device in its circuit-opening position, after the deceleration system has been dislodged.

Now assuming that the vehicle receives a shock, a longitudinal acceleration will be applied inter alia to elements 11, 13, 18 and 20 so as to generate a horizontal force $f$ at the apex 14 of cone 13. Let $H$ be the height of this cone, when $f > FR/H$, the equilibrium of cone 13 is disrupted and this cone will tilt in the direction of the force $f$ (see FIG. 2), so that the line of action 14—21 of force $f$ will overstep the limits of base 15, whereby the whole structure comprising the cone 13, inertia weight 11, spring 18 and dished member 20 will suddenly become dislodged, as shown FIG. 3, thus releasing the pin 6 and therefore the spring blade 5, so that the movable contact stud 2 will move away from the fixed contact stud 1 and open the circuit.

It may happen that even in case of a shock strong enough to release the device, the vehicle can nevertheless be driven again to a repair workshop without any external assistance. To spare the trouble for the driver to reset the deceleration detector, the additional terminal 7 connected to terminal 3 by a contact strip 8 permits short circuiting the device, by simply transferring the wire of terminal 4 from this terminal to terminal 7.

Figure 4:
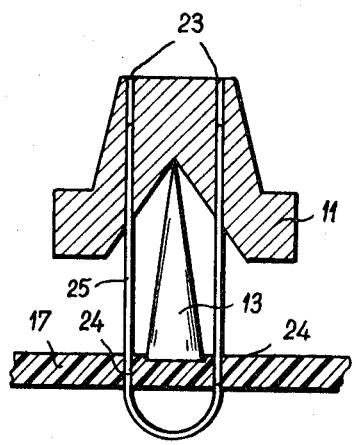
FIG. 4 is a detail view showing an arrangement permitting of resetting the cutout to its operative position.

To facilitate the resetting of the detector and as shown in FIG. 4 a pair of holes 23 is formed through the inertia weight 11 and another pair of holes 24 is formed through the bottom cover 17. These substantially aligned holes permit the insertion of a strap or hairpin member 25 for locking the inertia weight 11 and cone 13 in relation to the unset bottom cover 17. Under these conditions it is only necessary to fit the spring 18 and dished member 20 on t top of this assembly, insert the whole assembly into the case 10 and remove the strap or hairpin member 25.

According to a specific form of embodiment of the safety cutout of this invention as applied to a battery-operated vehicle, the movable contact stud 2 is associated directly or indirectly with the control member of a contactor, circuit breaker or switch (not shown in the drawing), whether of the single-pole or multipole type, with or without spark blowout.

Of course, various modifications and variations may be brought to the specific form of embodiment of the present invention which is shown and described herein, without departing from the spirit and scope of the invention as set forth in the appended claims.

We claim:

1. A shock-sensitive safety cutout device, notably for automotive vehicles, comprising a case having an inner partition forming two chambers and being closed on each end by a detachable end cover, two operative means enclosed in the case, the first means being an electric switch in one of said chambers and the other means being a deceleration detector means in the other chamber operatively connected to said switch, said detector means comprising a low-friction articulated system comprising a single inertia weight pivoting on only one point with its equilibrium disrupted when overstepping a dead center position after a minimum horizontal deceleration is applied to said single inertia weight thereby causing the automatic opening of said electric switch.

2. A safety cutout device according to claim 1, wherein said electric switch comprising two contacts and at least two terminals, one of said contacts being directly rigid with one of said terminals and constituting the fixed contact, a resilient conducting member connecting the other contact to another terminal and constituting the movable contact of said switch, said resilient conducting member constantly biasing said movable contact away from the fixed contact, and a pin depending from the side of the movable contact away from the fixed contact and serving as a mechanical connection between the switch and said deceleration detector means.

3. A safety cutout device according to claim 2, further comprising an aperture formed in said partition through which said pin extends, the cover closing the end of said case containing said switch having said switch contacts and terminals mounted thereon and the other cover having a shallow cylindrical recess formed in its inner face.

4. A safety cutout device according to claim 3, wherein said inertia weight has a conical cavity formed in its lower face, a conical member having an apex angle considerably smaller than that of said cavity, engageable with its apex in said cavity and having its base seated in said cylindrical recess in said other cover, the apex of said conical member serving to center said inertia weight and as a pivot therefor, spring means having one end engaged on said inertia weight and its opposite end engaged with a dished member centered and pivoted in the end of said pin.

5. A safety cutout device according to claim 4, further comprising at least one aperture formed through said inertia weight of said deceleration detector means, at least one corresponding aperture formed in said other cover of said case and a rodlike member insertable through said apertures when aligned for resetting the detector means and permitting operation of the cutout device again.

6. A safety cutout device according to claim 2, wherein said movable contact of the switch is connected with the control member of a circuit breaker.